(12) United States Patent
Mori et al.

(10) Patent No.: US 7,970,529 B2
(45) Date of Patent: Jun. 28, 2011

(54) VEHICLE AND LANE RECOGNIZING DEVICE

(75) Inventors: Naoki Mori, Wako (JP); Sachio Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 864 days.

(21) Appl. No.: 11/919,634

(22) PCT Filed: Jun. 20, 2006

(86) PCT No.: PCT/JP2006/312308
§ 371 (c)(1),
(2), (4) Date: Oct. 31, 2007

(87) PCT Pub. No.: WO2007/000912
PCT Pub. Date: Jan. 4, 2007

(65) Prior Publication Data
US 2009/0118994 A1 May 7, 2009

(30) Foreign Application Priority Data

Jun. 27, 2005 (JP) .................................. 2005-186383

(51) Int. Cl.
*G08G 1/00* (2006.01)
(52) U.S. Cl. .......... 701/117; 701/28; 701/213; 340/436; 340/435; 382/104
(58) Field of Classification Search .................. 701/117, 701/28, 1, 213; 340/436, 438, 435; 382/104
See application file for complete search history.

(56) References Cited

U.S. PATENT DOCUMENTS

| 6,748,302 B2 * | 6/2004 | Kawazoe ........................ 701/1 |
| 2005/0169501 A1 * | 8/2005 | Fujii et al. .................... 382/104 |
| 2005/0273215 A1 * | 12/2005 | Kuge ............................... 701/1 |

FOREIGN PATENT DOCUMENTS

| EP | 1 143 398 A2 | 10/2001 |
| EP | 1 143 398 A3 | 10/2003 |
| JP | 5-297941 A | 11/1993 |
| JP | 11-072337 A | 3/1999 |
| JP | 11-211492 A | 8/1999 |
| JP | 2001-291197 A | 10/2001 |
| JP | 2001-344687 A | 12/2001 |
| JP | 2002-008199 A | 1/2002 |
| JP | 2002-092794 A | 3/2002 |
| JP | 2003-123058 A | 4/2003 |
| JP | 2003-205805 A | 7/2003 |

* cited by examiner

*Primary Examiner* — Thomas G Black
*Assistant Examiner* — Marthe Marc Coleman
(74) *Attorney, Agent, or Firm* — Arent Fox LLP

(57) ABSTRACT

A lane recognizing device comprises: an image processing means which performs a process of estimating a lane of a road by processing an image of the road and outputs a result of the process as first lane information; a lane estimating means which performs a process of estimating the lane using a map data of the road and the current position information of a vehicle and outputs a result of the process as second lane information; and an actual lane recognizing means which recognizes an actual lane of the road on the basis of the first lane information and the second lane information. Thereby, even if there is an unpredictable skid mark or road repaired part, it is possible to detect the lane accurately while increasing the opportunities for detecting the lane as much as possible by processing the road image and obtaining the road information and the map data.

6 Claims, 7 Drawing Sheets

VEHICLE AND LANE RECOGNIZING DEVICE

CROSS-REFERENCE TO RELATED APPLICATION

This application is a National Stage entry of International Application No. PCT/JP2006/312308, filed Jun. 20, 2006, the entire specification claims and drawings of which are incorporated herewith by reference.

TECHNICAL FIELD

The present invention relates to a vehicle and lane recognizing device for recognizing the lane of a road by processing an image of the road obtained by an imaging means such as a camera and obtaining information on the road from a GPS or the like and map data.

BACKGROUND ART

In recent years, there has been known a technique of detecting a lane mark such as a white line on a road by capturing an image of the road along which a vehicle is traveling and processing the captured image with an imaging means such as a CCD camera mounted on the vehicle and performing vehicle control or provision of information to a driver on the basis of information on the lane (traffic lane) along which the vehicle is traveling recognized from a detection result. In this technical field, there has been suggested a technique for recognizing a lane accurately by performing image processing according to the situation of a road ahead based on the road information obtained from a GPS or map data or the like when recognizing the lane by image processing from the road image (refer to, for example, Japanese Patent Laid-Open No. Hei 11-72337/1999 (hereinafter, referred to as Patent Document 1) and Japanese Patent Laid-Open No. 2003-123058 (hereinafter, referred to as Patent Document 2). Moreover, there has been suggested a technique of performing the control or the provision of information by supplementing an image processing result with road information obtained from a GPS, map data, or the like (refer to, for example, Japanese Patent Laid-open No. 2002-92794 (hereinafter, referred to as Patent Document 3) and Japanese Patent Laid-Open No. 2003-205805 (hereinafter, referred to as Patent Document 4)).

The traffic lane recognizing device in Patent Document 1 includes an image information processing means which recognizes the positions of left and right white lines on the road ahead by processing image information from a camera, and a traffic lane estimating means which estimates the position and feature of the traffic lane and a positional relationship between the traffic lane and the subject vehicle from the white line position image information obtained by the image information processing means. The traffic lane recognizing device further includes a road condition determining means which determines whether there is a special particular road area (for example, a particular white line area having white lines in a striped pattern or zebra pattern) different from an area having normal white lines on the road ahead. The road condition determining means determines whether there is the particular road area on the road ahead while associating data on the particular road area stored in a ROM with vehicle position information obtained from a GPS. Although the image information processing means recognizes the midpoint of both edges of a white line as a position in the road width direction of the white line for a normal white line, a particular part of the white line area (an edge on the main line side of a recognizable white line area) is considered to be a position in the road width direction of the white line if the road condition determining means determines that there is the particular road area on the road ahead of the vehicle. Thereafter, the traffic lane estimating means estimates an area defined by the extracted left and right white lines on the road or an area defined by one of the extracted left and right white lines on the road and a previously recognized lane width as a traffic lane.

The traffic lane recognizing device in Patent Document 2 includes an image processing means which detects a traffic lane by processing a road image captured by a camera. The image processing means has a plurality of image processing algorithms different from each other according to a plurality of types of lane marks such as a white line, a raised marker, a post cone and so on. In this situation, the traffic lane recognizing device receives position information of the road along which the vehicle is currently traveling from a satellite by using a GPS receiving means and determines the type of lane marks on the road ahead along which the vehicle is currently traveling from a road map data file which stores lane mark types for respective roads. The traffic lane recognizing device selects an image processing algorithm suitable for the lane marks ahead out of the plurality of image processing algorithms and detects the traffic lane.

A warning device for a vehicle in Patent Document 3 includes a white line recognition system which recognizes left and right division lines (white lines) of the lane of the road along which the vehicle is traveling from the image obtained by a camera by image processing and a sensor group (vehicle speed sensors or the like) for use in obtaining vehicle behaviors. Moreover, the warning device for a vehicle includes a navigation system which obtains position information and road information on the road along which the vehicle is traveling by comparison with map data read from a CD-ROM on the basis of the position of a subject vehicle obtained from s GPS. The warning device for a vehicle issues a warning for a driver when predicting that the vehicle deviates from the lane on the basis of the left and right division lines of the recognized lane and vehicle behaviors obtained by the sensor group. In this situation, if the vehicle is traveling in a given road section (a road section determined to be a section where a false warning has been issued in the past) when determined from the obtained road information, the warning device for a vehicle changes a warning generation condition to a condition under which the warning is more difficult to be issued in comparison with other cases.

A vehicle driving support apparatus in Patent Document 4 includes a surroundings monitoring means which recognizes white lines or the like indicating a lane by processing an image ahead of a vehicle captured by a camera, and a driving support means which supports a driver's operation by a lane deviation warning control or the like on the basis of information from the surroundings monitoring means. Furthermore, the vehicle driving support apparatus includes a road condition recognizing means, which recognizes the road conditions (branch road or the like) of the road ahead of the vehicle from the current position of the vehicle obtained based on radio wave information from a plurality of satellites, map information stored in a storage medium such as a DVD-ROM, and road ahead information obtained by a road-vehicle communication from road infrastructure and which determines whether a problem will occur in driving support control according to the road ahead conditions. Then, the vehicle driving support apparatus previously provides a driver with information on the basis of information from the road condition recognizing means if reliability of the operation of the driving support means is projected to decrease.

In some cases, however, there may be an unpredictable skid mark or road repaired part on the road. In this situation, the existence of the skid mark or road repaired part cannot be known from previously stored road information. Moreover, it is difficult to recognize a lane accurately by image processing based on a road image due to the skid mark or road repaired part. Therefore, in this case, there is a problem that it is difficult to recognize the lane accurately even if the image processing is performed in consideration of the road ahead condition on the basis of the road information obtained from the GPS, map data, or the like, similarly to Patent Documents 1 and 2. Furthermore, in the above situation, even the device and apparatus in Patent Documents 3 and 4 find it hard to detect the lane by the image processing and cannot supplement the image processing result with the road information obtained from the GPS, map data, or the like, which leads to a problem that they cannot appropriately control the vehicle or provide the driver with information.

DISCLOSURE OF THE INVENTION

Problem to be Solved by the Invention

In order to solve the above problems, an object of the present invention is to provide a vehicle and lane recognizing device capable of detecting a lane accurately while increasing opportunities for detecting the lane as much as possible by processing a road image obtained via an imaging means such as a camera and obtaining road information from GPS and map data, even if there is an unpredictable skid mark or road repaired part on the road.

Means for Solving the Problem

In order to achieve the above object, according to a first aspect of the present invention, there is provided a vehicle comprising: an imaging means; an image processing means which obtains an image of a road via the imaging means, performs a process of estimating a lane of the road by processing the obtained image, and outputs a result of the process as first lane information; holding means which holds map data of the road; position information obtaining means which obtains the current position information of the vehicle; a lane estimating means which performs a process of estimating the lane of the road using the map data and the current position information and outputs a result of the process as second lane information; and an actual lane recognizing means which recognizes an actual lane of the road on the basis of the first lane information and the second lane information.

Furthermore, according to the first aspect of the present invention, there is provided a lane recognizing device comprising: an image processing means which performs a process of estimating a lane of a road by processing an image of the road obtained via an imaging means mounted on a vehicle and outputs a result of the process as first lane information; a holding means which holds map data of the road; a position information obtaining means which obtains the current position information of the vehicle; a lane estimating means which performs a process of estimating the lane of the road using the map data and the current position information and outputs a result of the process as second lane information; and an actual lane recognizing means which recognizes an actual lane of the road on the basis of the first lane information and the second lane information (First aspect of the present invention).

According to the vehicle and lane recognizing device of the first aspect of the present invention, the image processing means performs the process of estimating the lane of the road by processing the image of the road obtained via the imaging means and outputs the result of the process as the first lane information. Thereby, information on the lane along which the vehicle is traveling is obtained. If, however, there is, for example, an unpredictable skid mark or road repaired part on the road when estimating the lane by the image processing, it is difficult to estimate the lane appropriately. Also in this case, however, it is preferable that the actual lane is recognized as appropriately as possible.

In this situation, the lane estimating means performs the process of estimating the lane along which the vehicle is traveling using the map data and the current position information and outputs the result of the process as the second lane information. Thereby, the lane information can be obtained in a different method from the method of estimating the lane by the image processing. Moreover, since the actual lane recognizing means recognizes the actual lane on the basis of both of the first lane information and the second lane information, the information on the lane estimated by the map data and position information can be used as the information indicating the actual lane even if the lane is not appropriately estimated by the image processing. Therefore, it is possible to detect the actual lane accurately while increasing the opportunities for detecting the actual lane as much as possible.

Furthermore, according to a second aspect of the present invention, there is provided a vehicle comprising: an imaging means; an image processing means which obtains an image of a road via the imaging means, performs a process of estimating a lane of the road by processing the obtained image, and outputs a result of the process as first lane information; a holding means which holds map data of the road; position information obtaining means which obtains the current position information of the vehicle; lane estimating means which performs a process of estimating the lane of the road using the map data and the current position information and outputs a result of the process as second lane information; a means which calculates lane similarity, which is a degree of similarity between the shape of the lane indicated by the first lane information and the shape of the lane indicated by the second lane information; and an actual lane recognizing means which recognizes an actual lane of the road on the basis of the first lane information, the second lane information, and a result of comparison between the lane similarity and a given threshold value.

Furthermore, according to the second aspect of the present invention, there is provided a lane recognizing device comprising: an image processing means which performs a process of estimating a lane of a road by processing an image of the road obtained via an imaging means mounted on a vehicle and outputs a result of the process as first lane information; a holding means which holds map data of the road; a position information obtaining means which obtains the current position information of the vehicle; a lane estimating means which performs a process of estimating the lane of the road using the map data and the current position information and outputs a result of the process as second lane information; a means which calculates lane similarity, which is a degree of similarity between the shape of the lane indicated by the first lane information and the shape of the lane indicated by the second lane information; and an actual lane recognizing means which recognizes an actual lane of the road on the basis of the first lane information, the second lane information, and a result of comparison between the lane similarity and a given threshold value (Second aspect of the present invention).

According to the vehicle and lane recognizing device of the second aspect of the present invention, similarly to the first aspect of the present invention, the image processing means performs the process of estimating the lane of the road by processing the image of the road obtained via the imaging means and outputs the result of the process as the first lane information. Thereby, information on the lane along which the vehicle is traveling is obtained. If, however, there is, for example, an unpredictable skid mark or road repaired part on the road when estimating the lane by the image processing, it is difficult to estimate the lane appropriately. Also in this case, however, it is preferable that the actual lane is recognized as appropriately as possible. In this situation, the lane estimating means performs the process of estimating the lane along which the vehicle is traveling using the map data and the current position information of the vehicle and outputs the result of the process as the second lane information. Thereby, the lane information can be obtained in a different method from the method of estimating the lane by the image processing.

Moreover, since the actual lane recognizing means recognizes the actual lane on the basis of both of the first lane information and the second lane information, the information on the lane estimated by the map data and position information can be used as the information indicating the actual lane even if the lane is not appropriately estimated by the image processing. Therefore, it is possible to detect the actual lane accurately while increasing the opportunities for detecting the actual lane as much as possible. Then, the actual lane recognizing means recognizes the actual lane on the basis of the first lane information, the second lane information, and the result of comparison between the lane similarity, which is the degree of similarity between the shape of the lane indicated by the first lane information and the shape of the lane indicated by the second lane information, and the given threshold value. Thereby, if the lane is estimated by both of the estimation process by the image processing and the estimation process by the map data and position information, the actual lane recognizing means can grasp the reliability of the information on the lane estimated by the image processing and the reliability of the information on the lane estimated by the map data and position information from the degree of similarity between the shapes of the lanes estimated by both, and therefore it can recognize the actual lane more appropriately.

In the above, if the shape of the lane estimated by the image processing and the shape of the lane estimated by the map data and position information are each accurately estimated from the shape of the actual lane, it is conceivable that the degree of similarity between the shapes of the lane estimated by both is high. Furthermore, if the lane is estimated by the image processing accurately, the shape of the lane estimated by the image processing is considered to be more accurate in position than the shape of the lane estimated by the map data and position information since the image processing of the actual road ahead of the vehicle is more local than the processing by the map data and position information in view of the position-fix accuracy of the GPS or the like and data density of the map data.

Therefore, in the vehicle and lane recognizing device according to the second aspect of the present invention, preferably the actual lane recognizing means recognizes the actual lane on the basis of the first lane information in the case where the lane similarity is greater than the given threshold value (Third aspect of the present invention).

According to the third aspect of the present invention, if the lane similarity is greater than the given threshold value, the actual lane is recognized on the basis of the first lane information, and therefore the reliability of the lane estimation by the image processing is verified according to the information on the lane estimated by the map data and position information. Furthermore, if the lane can be considered to be accurately estimated by the image processing, the information on the shape of the lane estimated by the image processing, which is thought to be more accurate than the shape of the lane estimated by the map data and position information, is used as information indicating the actual lane, by which the actual lane is appropriately recognized.

Moreover, if the shape of the lane estimated by the image processing differs from the shape of the lane estimated by the map data and position information, the actual lane is not likely to be appropriately estimated in one or both of the lane estimation by the image processing and the lane estimation by the map data and position information. For example, if there is a branch or the like in the road ahead, it is conceivable that the lane shape cannot be appropriately estimated in either approach.

Therefore, in the vehicle and lane recognizing device according to the second aspect of the present invention, preferably the actual lane recognizing means outputs information indicating that the actual lane is not recognized in the case where the lane similarity is equal to or smaller than the given threshold value (Fourth aspect of the present invention).

According to the fourth aspect of the present invention, the actual lane recognizing means outputs the information indicating that the actual lane is not recognized if the lane similarity is equal to or smaller than the given threshold value, and therefore if the actual lane is not likely to be appropriately estimated in one or both of the lane estimation by the image processing and the lane estimation by the map data and position information, it can grasp that the actual lane is not recognized appropriately.

Moreover, in the case where there is an unpredictable skid mark, road repaired part, or the like on the road when performing the process of estimating the lane through the image processing, it is conceivable that the lane is not estimated accurately or no lane is estimated. Further, also when the process of estimating the lane is performed based on the map data and position information, for example, when the position information obtaining means obtains the vehicle position information from a GPS or other driving information providing services via signals and communication, it is conceivable that the lane cannot be estimated because the current position information of the vehicle cannot be obtained due to a signal or communication failure or the like.

Therefore, in the vehicle and lane recognizing device according to the second aspect of the present invention, the first lane information includes first estimation execution information indicating whether the lane is estimated by the process of the image processing means and first lane shape information indicating the shape of the estimated lane in the case where the lane is estimated. Furthermore, the second lane information includes second estimation execution information indicating whether the lane is estimated by the process of the lane estimating means and second lane shape information indicating the shape of the estimated lane in the case where the lane is estimated. Then, the means which calculates the lane similarity uses the first lane shape information and the second lane shape information when calculating the lane similarity. Furthermore, preferably the actual lane recognizing means includes: a means which determines and outputs actual lane recognition execution information indicating whether the actual lane is recognized on the basis of the first estimation execution information, the second estimation execution information, and the result of comparison between the lane similarity and the given threshold value; and a means which determines and outputs actual lane shape information indicating the shape of the recognized lane in the case where the lane is recognized on the basis of the first lane shape information and the second lane shape information (Fifth aspect of the present invention).

According to the fifth aspect of the present invention, the actual lane recognition execution information indicating whether the actual lane is recognized is determined on the basis of the first estimation execution information, the second estimation execution information, and the result of the comparison between the lane similarity and the given threshold value. Additionally, the actual lane shape information indicating the shape of the recognized lane in the case where the lane is recognized is determined based on the first lane shape information and the second lane shape information. In this condition, the lane similarity is calculated using the first lane shape information and the second lane shape information. Thereby, information indicating the actual lane is appropriately determined even if the lane is not estimated by the image processing or even if the lane is not estimated by the map data and position information. Therefore, it is possible to detect the actual lane accurately while increasing the opportunities for detecting the actual lane as much as possible.

Moreover, if the lane is estimated by both of the estimation process by the image processing and the estimation process by the map data and position information, it is possible to grasp the reliability of the information on the lane estimated by the image processing and the reliability of the information on the lane estimated by the map data and position information from the degree of similarity between the shapes of the lanes estimated by both, and therefore the actual lane can be recognized more appropriately.

Furthermore, in the vehicle and lane recognizing device according to the fifth aspect of the present invention, preferably the actual lane recognizing means sets information indicating that the lane is recognized as the actual lane recognition execution information and sets the second lane shape information as the actual lane shape information in the case where the first estimation execution information indicates that the lane is not estimated and in the case where the second estimation execution information indicates that the lane is estimated (Sixth aspect of the present invention).

According to the sixth aspect of the present invention, the actual lane recognizing means sets the second lane shape information as the actual lane shape information if the first estimation execution information indicates that the lane is not estimated and if the second estimation execution information indicates that the lane is estimated. Therefore, even if the lane cannot be estimated by the image processing, the image processing result is supplemented with the information on the lane estimated by the map data and position information, which increases the opportunities for detecting the actual lane as much as possible.

Furthermore, in the vehicle and lane recognizing device according to the fifth aspect of the present invention, in the case where the second estimation execution information indicates that the lane is not estimated, preferably the actual lane recognizing means sets information indicating that the lane is recognized as the actual lane recognition execution information and sets the first lane shape information as the actual lane shape information in the case where the first estimation execution information indicates that the lane is estimated; and sets information indicating that the lane is not recognized as the actual lane recognition execution information in the case where the first estimation execution information indicates that the lane is not estimated (Seventh aspect of the present invention).

According to the seventh aspect of the present invention, the actual lane recognizing means can use the result of the lane estimation by the image processing directly as information indicating the actual lane if the lane is estimated by the image processing in the case where the lane is not estimated by the map data and position information. Moreover, if the lane is not estimated by the map data and position information and not estimated by the image processing, either, information indicating that the lane is not recognized is set as the actual lane recognition execution information, and therefore, the actual lane recognizing means can clearly grasp that the actual lane is not recognized.

Furthermore, in the vehicle and lane recognizing device according to the fifth aspect of the present invention, in the case where the first estimation execution information indicates that the lane is estimated and where the second estimation execution information indicates that the lane is estimated, the actual lane recognizing means sets information indicating that the lane is recognized as the actual lane recognition execution information and sets the first lane shape information as the actual lane shape information in the case where the lane similarity is greater than the given threshold value. Furthermore, in the case where the first estimation execution information indicates that the lane is not estimated and the second estimation execution information indicates that the lane is estimated, the actual lane recognizing means sets information indicating that the lane is recognized as the actual lane recognition execution information and sets the second lane shape information as the actual lane shape information. Furthermore, in the case where the first estimation execution information indicates that the lane is not estimated and the second estimation execution information indicates that the lane is not estimated, the actual lane recognizing means sets information indicating that the lane is recognized as the actual lane recognition execution information and sets the first lane shape information as the actual lane shape information.

Moreover, the actual lane recognizing means includes means which sets and outputs the reliability of recognition in the case where the actual lane is recognized so as to set the reliability to a first level, which is the highest level, in the case where the lane similarity is greater than the given threshold value in the case where the first estimation execution information indicates that the lane is estimated and the second estimation execution information indicates that the lane is estimated. Furthermore, actual lane recognizing means sets the reliability to a second level, which is lower than the first level, in the case where the first estimation execution information indicates that the lane is estimated and the second estimation execution information indicates that the lane is not estimated. Furthermore, actual lane recognizing means sets the reliability to a third level, which is lower than the second level, in the case where the first estimation execution information indicates that the lane is not estimated and the second estimation execution information indicates that the lane is estimated (Eighth aspect of the present invention).

According to the above, if the actual lane is recognized, the reliability of the recognition is output. If the lane similarity is greater than the given threshold value, then the reliability is set to the first level, which is the highest level. Therefore, if it is possible to consider the actual lane to be estimated accurately due to the high similarity between the shape of the lane estimated by the image processing and the shape of the lane estimated by the map data and position information, the reliability is set highest.

Furthermore, if the first estimation execution information indicates that the lane is estimated and the second estimation execution information indicates that the lane is not estimated, it means that the lane is estimated only by the image processing. In this case, the reliability of the lane estimation by the image processing cannot be verified using the information on the lane estimated by the map data and position information, and therefore the reliability is set to the second level, which is lower than the first level.

Still further, if the first estimation execution information indicates that the lane is not estimated and the second estimation execution information indicates that the lane is estimated, it means that the lane is estimated only by the map data and position information. In this case, the lane estimation by the map data and position information is considered to be less accurate than the lane estimation by the image processing, in which a more local process is performed, in view of the position-fix accuracy of the GPS or the like and data density of the map data, and therefore the reliability is set to the third level, which is lower than the second level.

The setting and output of the reliability as described above allows the reliability of the information indicating the recognized actual lane to be clearly known. In addition, the reliability set as described above can be used to control the vehicle or to provide information to the driver in addition to the information indicating the actual lane.

Note that the lane along which the vehicle travels is generally composed of a left-hand line, which defines the left side of the lane, and a right-hand line, which defines the right side of the lane.

Therefore, in the vehicle and lane recognizing device according to the second aspect of the present invention, the first lane information output by the image processing means includes: first left estimation execution information which indicates whether the left-hand line defining the left side of the lane is estimated by the process of the image processing means; first left-hand line shape information which indicates the shape of the estimated left-hand line in the case where the left-hand line is estimated; first right estimation execution information which indicates whether the right-hand line defining the right side of the lane is estimated by the process of the image processing means; and first right-hand line shape information which indicates the shape of the estimated right-hand line in the case where the right-hand line is estimated. Furthermore, the second lane information output by the lane estimating means includes: second estimation execution information which indicates whether both of the left-hand line and the right-hand line are estimated by the process of the lane estimating means; second left-hand line shape information which indicates the shape of the estimated left-hand line in the case where the left-hand line is estimated; and second right-hand line shape information which indicates the shape of the estimated right-hand line in the case where the right-hand line is estimated.

Moreover, the actual lane recognizing means includes means which calculates left-hand line similarity, which is the degree of similarity between the first left-hand line shape information and the second left-hand line shape information in the case where the first left estimation execution information indicates that the left-hand line is estimated and in the case where the second estimation execution information indicates that the left-hand line and the right-hand line are estimated. Furthermore, the actual lane recognizing means includes means which calculates right-hand line similarity, which is the degree of similarity between the first right-hand line shape information and the second right-hand line shape information in the case where the first estimation execution information indicates that the right-hand line is estimated and in the case where the second estimation execution information indicates that the left-hand line and the right-hand line are estimated. Furthermore, preferably the actual lane recognizing means includes means which determines and outputs: actual left recognition execution information which indicates whether the actual left-hand line defining the left side of the actual lane is recognized; actual left-hand line shape information which indicates the shape of the recognized actual left-hand line in the case where the actual left-hand line is recognized; actual right recognition execution information which indicates whether the actual right-hand line defining the right hand of the actual lane is recognized; and actual right-hand line shape information which indicates the shape of the recognized actual right-hand line in the case where the actual right-hand line is recognized, according to a result of comparing the calculated left-hand line similarity and right-hand line similarity with a given threshold value (Ninth aspect of the present invention).

According to the ninth aspect of the present invention, the actual left recognition execution information, the actual left-hand line shape information, the actual right recognition execution information, and the actual right-hand line shape information are determined according to the result of comparing the calculated left-hand line similarity and right-hand line similarity with the given threshold value. Thereby, in the case where the left-hand line and the right-hand line are estimated by both of the estimation process by the image processing and the estimation process by the map data and position information, the actual lane recognizing means can grasp the reliability of the information on the left-hand line and the right-hand line estimated by the image processing and the reliability of the information on the left-hand line and the right-hand line estimated by the map data and position information according to the degree of similarity in shape between the left-hand line and the right-hand line estimated by both. Therefore, the actual lane recognizing means can recognize the actual left-hand line and right-hand line more appropriately.

In the above, in the case where the shapes of the left-hand line and right-hand line estimated by the image processing and the shapes of the left-hand line and right-hand line estimated by the map data and position information are accurately estimated from the shapes of the actual left-hand line and right-hand line, it is considered that the shapes of the left-hand line and right-hand line estimated by both have high similarity with each other. Furthermore, the image processing of the actual road ahead of the vehicle is more local than the processing by the map data and position information in view of the position-fix accuracy of the GPS or the like and data density of the map data. Therefore, if the left-hand line and the right-hand line are estimated accurately by the image processing, the shapes of the left-hand line and right-hand line estimated by the image processing are thought to be more accurate imposition than the shapes of the left-hand line and right-hand line estimated by the map data and position information.

Therefore, in the vehicle and lane recognizing device according to the ninth aspect of the present invention, the actual lane recognizing means sets information indicating that the actual left-hand line and the actual right-hand line are recognized as the actual left recognition execution information and as the actual right recognition execution information, respectively, in the case where one or both of the left-hand line similarity and the right-hand line similarity are calculated and where one or both of the calculated left-hand line similarity and right-hand line similarity are greater than the given threshold value. Additionally, preferably the actual lane recognizing means sets the first left-hand line shape information as the actual left-hand line shape information in the case where the first left estimation execution information indicates that the left-hand line is estimated, sets the second left-hand line shape information as the actual left-hand line shape information in the case where the first left estimation execution information indicates that the left-hand line is not estimated, sets the first right-hand line shape information as the actual right-hand line shape information in the case where the first right estimation execution information indicates that the right-hand line is estimated, and sets the second left-hand line shape information as the actual right-hand line shape information in the case where the first right estimation execution information indicates that the right-hand line is not estimated (Tenth aspect of the present invention).

According to the tenth aspect of the present invention, the actual lane recognizing means sets the information indicating that the actual left-hand line and the actual right-hand line are recognized as the actual left recognition execution information and as the actual right recognition execution information, respectively, in the case where the one or both of the left-hand line similarity and the right-hand line similarity are calculated and where one or both of the calculated left-hand line similarity and right-hand line similarity are greater than the given threshold value. Therefore, if the reliability of the estimation of the left-hand line and right-hand line by the image processing is verified by the information on the left-hand line and right-hand line estimated by the map data and position information and thereby the left-hand line and the right-hand line are considered to be estimated accurately by the image processing, information indicating that the lane is recognized is appropriately set as the information on the actual left-hand line and right-hand line.

Additionally, the actual lane recognizing means sets the first left-hand line shape information as the actual left-hand line shape information if the first left estimation execution information indicates that the left-hand line is estimated and sets the first right-hand line shape information as the actual right-hand line shape information if the first right estimation execution information indicates that the right-hand line is estimated, and therefore the information on the shapes of the left-hand line and right-hand line estimated by the image processing, which is thought to be more accurate than the shapes of the left-hand line and right-hand line estimated by the map data and position information, is set appropriately as information on the shapes of the actual left-hand line and right-hand line.

Moreover, the actual lane recognizing means sets the second left-hand line shape information as the actual left-hand line shape information if the first left estimation execution information indicates that the left-hand line is not estimated and sets the second left-hand line shape information as the actual right-hand line shape information if the first right estimation execution information indicates that the right-hand line is not estimated. Therefore, even if the left-hand line and the right-hand line cannot be estimated by the image processing, the image processing result is supplemented with the information on the left-hand line and right-hand line estimated by the map data and position information, which thereby increases the opportunities for detecting the actual left-hand line and right-hand line as much as possible.

In addition, if the shapes of the left-hand line and right-hand line estimated by the image processing differ from the shapes of the left-hand line and right-hand line estimated by the map data and position information, there is a possibility that the actual left-hand line and right-hand line are not estimated appropriately in one or both of the estimation of the left-hand line and right-hand line by the image processing and the estimation of the left-hand line and right-hand line by the map data and position information.

Accordingly, in the vehicle and lane recognizing device according to the ninth aspect of the present invention, preferably the actual lane recognizing means sets information indicating that the actual left-hand line and the actual right-hand line are not recognized as the actual left recognition execution information and as the actual right recognition execution information, respectively, in the case where both of the left-hand line similarity and the right-hand line similarity are calculated and at least one of the calculated left-hand line similarity and right-hand line similarity is equal to or smaller than the given threshold value and where one of the left-hand line similarity and the right-hand line similarity is calculated and one of the calculated left-hand line similarity and right-hand line similarity is equal to or smaller than the given threshold value (11th aspect of the present invention).

According thereto, the actual lane recognizing means sets the information indicating that the actual left-hand line and the actual right-hand line are not recognized as the actual left recognition execution information and as the actual right recognition execution information, respectively, in the case where both of the left-hand line similarity and the right-hand line similarity are calculated and at least one of the calculated left-hand line similarity and right-hand line similarity is equal to or smaller than the given threshold value and where one of the left-hand line similarity and the right-hand line similarity is calculated and one of the calculated left-hand line similarity and right-hand line similarity is equal to or smaller than the given threshold value. Therefore, if there is a possibility that the actual left-hand line and right-hand line are not estimated appropriately in one or both of the estimation of the left-hand line and right-hand line by the image processing and the estimation of the left-hand line and right-hand line by the map data and position information, the information indicating that the left-hand line and the right-hand line are not recognized is appropriately set as the actual left-hand line and right-hand line information.

Furthermore, in the vehicle and lane recognizing device according to the ninth aspect of the present invention, preferably the actual lane recognizing means sets information indicating that the actual left-hand line and the actual right-hand line are recognized as the actual left recognition execution information and as the actual right recognition execution information and sets the second left-hand line shape information as the actual left-hand line shape information and the second right-hand line shape information as the actual right-hand line shape information, in the case where the first left estimation execution information and the first right estimation execution information indicate that the left-hand line and the right-hand line are not estimated, respectively, and where the second estimation execution information indicates that the left-hand line and the right-hand line are estimated (12th aspect of the present invention).

According to the 12th aspect of the present invention, the actual lane recognizing means sets the second left-hand line shape information as the actual left-hand line shape information and sets the second right-hand line shape information as the actual right-hand line shape information in the case where the first left estimation execution information and the first right estimation execution information indicate that the left-hand line and the right-hand line are not estimated, respectively, and where the second estimation execution information indicates that the left-hand line and the right-hand line are estimated. Therefore, even if the left-hand line and the right-hand line cannot be estimated by the image processing, the image processing result is supplemented with the information on the left-hand line and right-hand line estimated by the map data and position information, which thereby increases the opportunities for detecting the actual left-hand line and right-hand line as much as possible.

Further, in the vehicle and lane recognizing device according to the ninth aspect of the present invention, the actual lane recognizing means sets information indicating that the actual left-hand line is recognized as the actual left recognition execution information and sets the first left-hand line shape information as the actual left-hand line shape information in the case where the first left estimation execution information indicates that the left-hand line is estimated in the case where the second estimation execution information indicates that the left-hand line and the right-hand line are not estimated. Furthermore, the actual lane recognizing means sets information indicating that the actual left-hand line is not recognized as the actual left recognition execution information in the case where the first left estimation execution information indicates that the left-hand line is not estimated. Still further, the actual lane recognizing means sets information indicating that the actual right-hand line is recognized as the actual right recognition execution information and sets the first right-hand line shape information as the actual right-hand line shape information in the case where the first right estimation execution information indicates that the right-hand line is estimated. Furthermore, preferably the actual lane recognizing means sets information indicating that the actual right-hand line is not recognized as the actual right recognition execution information in the case where the first right estimation execution information indicates that the right-hand line is not estimated (13th aspect of the present invention).

According to the 13th aspect of the present invention, the actual lane recognizing means can use a result of the estimation of the left-hand line or right-hand line by the image processing directly as the information indicating the actual left-hand line or right-hand line if the left-hand line or the right-hand line is estimated by the image processing in the case where the left-hand line and the right-hand line are not estimated by the map data and position information. Furthermore, if the left-hand line or right-hand line is not estimated by either of the map data and position information and by the image processing, the information indicating that the left-hand line or right-hand line is not recognized as the actual left recognition execution information or as the actual right recognition execution information, by which the actual lane recognizing means can grasp clearly that the actual left-hand line or right-hand line is not recognized.

Furthermore, in the vehicle and lane recognizing device according to the ninth aspect of the present invention, the actual lane recognizing means sets information indicating that the actual left-hand line and the actual right-hand line are recognized as the actual left recognition execution information and as the actual right recognition execution information, respectively, in the case where one or both of the left-hand line similarity and the right-hand line similarity are calculated and where one or both of the calculated left-hand line similarity and right-hand line similarity are greater than the given threshold value.

Additionally, the actual lane recognizing means sets the first left-hand line shape information as the actual left-hand line shape information in the case where the left estimation execution information indicates that the left-hand line is estimated, sets the second left-hand line shape information as the actual left-hand line shape information in the case where the first left estimation execution information indicates that the left-hand line is not estimated, sets the first right-hand line shape information as the actual right-hand line shape information in the case where the first right estimation execution information indicates that the right-hand line is estimated, and sets the second left-hand line shape information as the actual right-hand line shape information in the case where the first right estimation execution information indicates that the right-hand line is not estimated.

Furthermore, the actual lane recognizing means sets information indicating that the actual left-hand line and the actual right-hand line are recognized as the actual left recognition execution information and as the actual right recognition execution information in the case where the first left estimation execution information and the first right estimation execution information indicate that the left-hand line and the right-hand line are not estimated, respectively, and where the second estimation execution information indicates that the lane is estimated. Additionally, the actual lane recognizing means sets the second left-hand line shape information as the actual left-hand line shape information and sets the second right-hand line shape information as the actual right-hand line shape information.

Still further the actual lane recognizing means sets information indicating that the actual left-hand line is recognized as the actual left recognition execution information and sets the first left-hand line shape information as the actual left-hand line shape information in the case where the first left estimation execution information indicates that the left-hand line is estimated in the case where the second estimation execution information indicates that the left-hand line and the right-hand line are not estimated. In addition, the actual lane recognizing means sets information indicating that the actual left-hand line is not recognized as the actual left recognition execution information in the case where the first left estimation execution information indicates that the left-hand line is not estimated. Furthermore, the actual lane recognizing means sets information indicating that the actual right-hand line is recognized as the actual right recognition execution information and sets the first right-hand line shape information as the actual right-hand line shape information in the case where the first right estimation execution information indicates that the right-hand line is estimated. Still further the actual lane recognizing means sets information indicating that the actual right-hand line is not recognized as the actual right recognition execution information in the case where the first right estimation execution information indicates that the right-hand line is not estimated.

Moreover, the actual lane recognizing means includes means which sets and outputs reliability of recognition in the case where at least one of the actual left-hand line and the actual right-hand line are recognized, and it sets the reliability to a first level, which is the highest level, in the case where both of the left-hand line similarity and the right-hand line similarity are calculated and the calculated left-hand line similarity and right-hand line similarity are each greater than the given threshold value. Furthermore, the actual lane recognizing means sets the reliability to a second level, which is lower than the first level, in the case where one of the left-hand line similarity and the right-hand line similarity is calculated and one of the calculated left-hand line similarity and right-hand line similarity is greater than the given threshold value and in the case where the first left estimation execution information and the first right estimation execution information indicate that the left-hand line and the right-hand line are estimated, respectively, and the second estimation execution information indicates that the left-hand line and the right-hand line are not estimated. Furthermore, preferably the actual lane recognizing means sets the reliability to a third level, which is lower than the second level, in the case where one of the first left estimation execution information and the first right estimation execution information indicates that one of the left-hand line and the right-hand line is estimated and the second estimation execution information indicates that the left-hand line and the right-hand line are not estimated and in the case where the first left estimation execution information and the first right estimation execution information indicate that the left-hand line and the right-hand line are not estimated, respectively, and the second estimation execution information indicates that the left-hand line and the right-hand line are estimated (14th aspect of the present invention).

According to the 14th aspect of the present invention, if at least one of the actual left-hand line and the actual right-hand line is recognized, the reliability of the recognition is output. If both of the left-hand line similarity and the right-hand line similarity are calculated and both of the left-hand line similarity and the right-hand line similarity are greater than the given threshold value in the above, the reliability is set to the first level, which is the highest level. Therefore, if actual left-hand line and right-hand line is considered to be estimated accurately due to relatively high similarity between the shapes of the left-hand line and right-hand line estimated by the image processing and the shapes of the left-hand line and right-hand line estimated by the map data and position information, the reliability is set highest.

In addition, if one of the left-hand line similarity and the right-hand line similarity is calculated and one of the calculated left-hand line similarity and right-hand line similarity is greater than the given threshold value, it means that only one of the left-hand line and the right-hand line can be considered to be estimated accurately, and therefore the reliability is set to the second level, which is lower than the first level.

Furthermore, if the first left estimation execution information and the first right estimation execution information indicate that the left-hand line and the right-hand line are estimated, respectively, and the second estimation execution information indicates that the left-hand line and the right-hand line are not estimated, it means that the left-hand line and the right-hand line are estimated only by the image processing, and therefore the reliability of the estimation of the left-hand line and that of the right-hand line by the image processing cannot be verified by using information on the left-hand line and right-hand line estimated by the map data and position information, by which the reliability is set to the second level, which is lower than the first level.

Moreover, if one of the first left estimation execution information and the first right estimation execution information indicates that one of the left-hand line and the right-hand line is estimated and the second estimation execution information indicates that the left-hand line and the right-hand line are not estimated, it means that the left-hand line and the right-hand line are estimated only by the image processing. In this case, the reliability of the estimation of the left-hand line and that of the right-hand line by the image processing cannot be verified by using information on the left-hand line and right-hand line estimated by the map data and position information and only one of the left-hand line and the right-hand line is estimated, and therefore the reliability if set to a third level, which is lower than the second level.

In addition, if the first left estimation execution information and the first right estimation execution information indicate that the left-hand line and the right-hand line are not estimated, respectively, and the second estimation execution information indicates that the left-hand line and the right-hand line are estimated, it means that the left-hand line and the right-hand line are estimated only by the map data and position information. In this case, the estimation is considered to be less accurate than the estimation by the image processing in consideration of GPS position-fix accuracy or the like, and therefore the reliability is set to the third level, which is lower than the second level.

The lane recognizing device according to the present invention can clearly recognize the reliability of information indicating the recognized actual lane by setting and outputting the reliability as described hereinabove. Moreover, the reliability set in this manner can be used to control the vehicle or inform the driver in addition to the information indicating the actual lane.

BEST MODE FOR CARRYING OUT THE INVENTION

Figure 1:
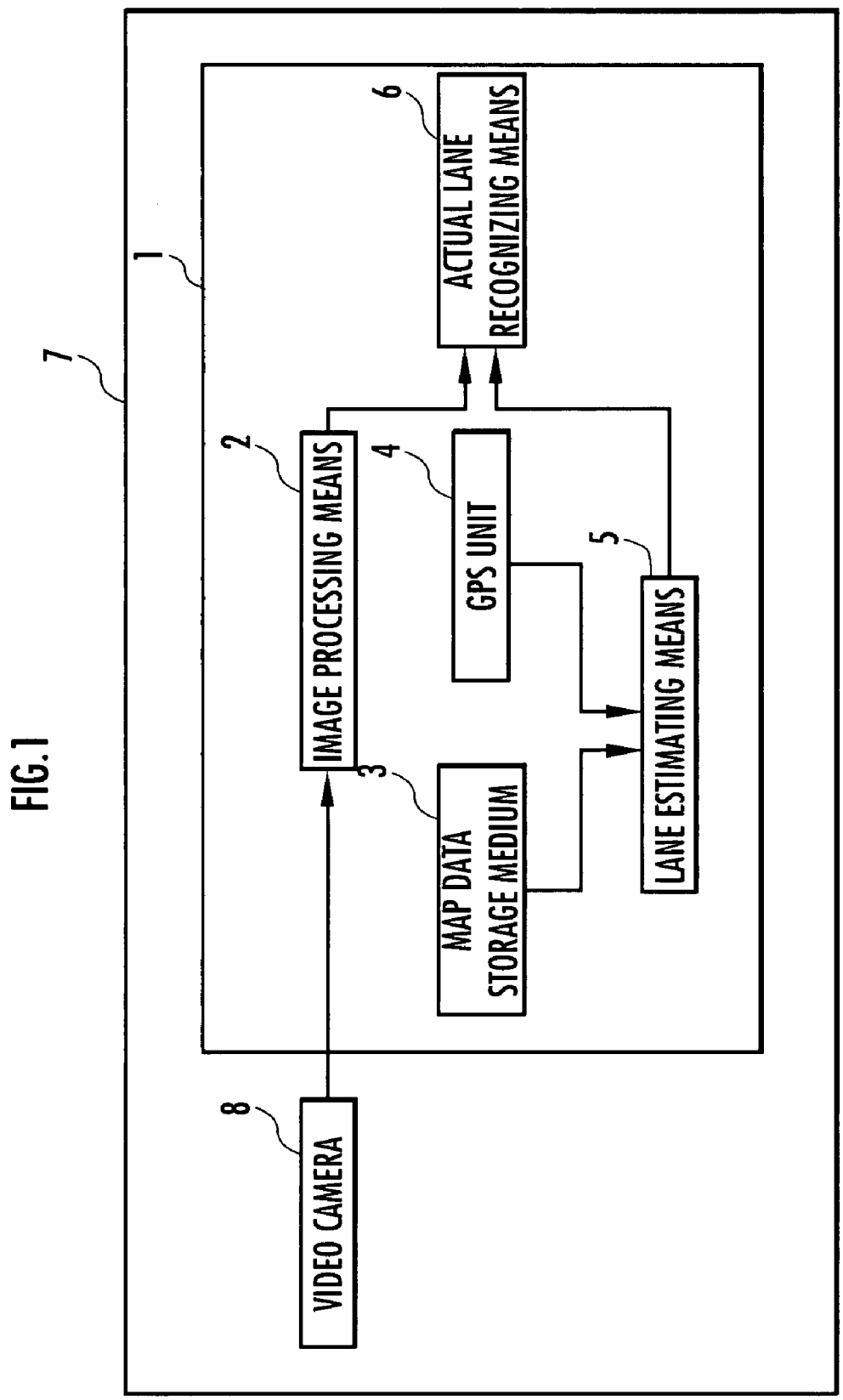
FIG. 1 It is a functional block diagram of a lane recognizing device according to a first embodiment of the present invention.
Figure 2:
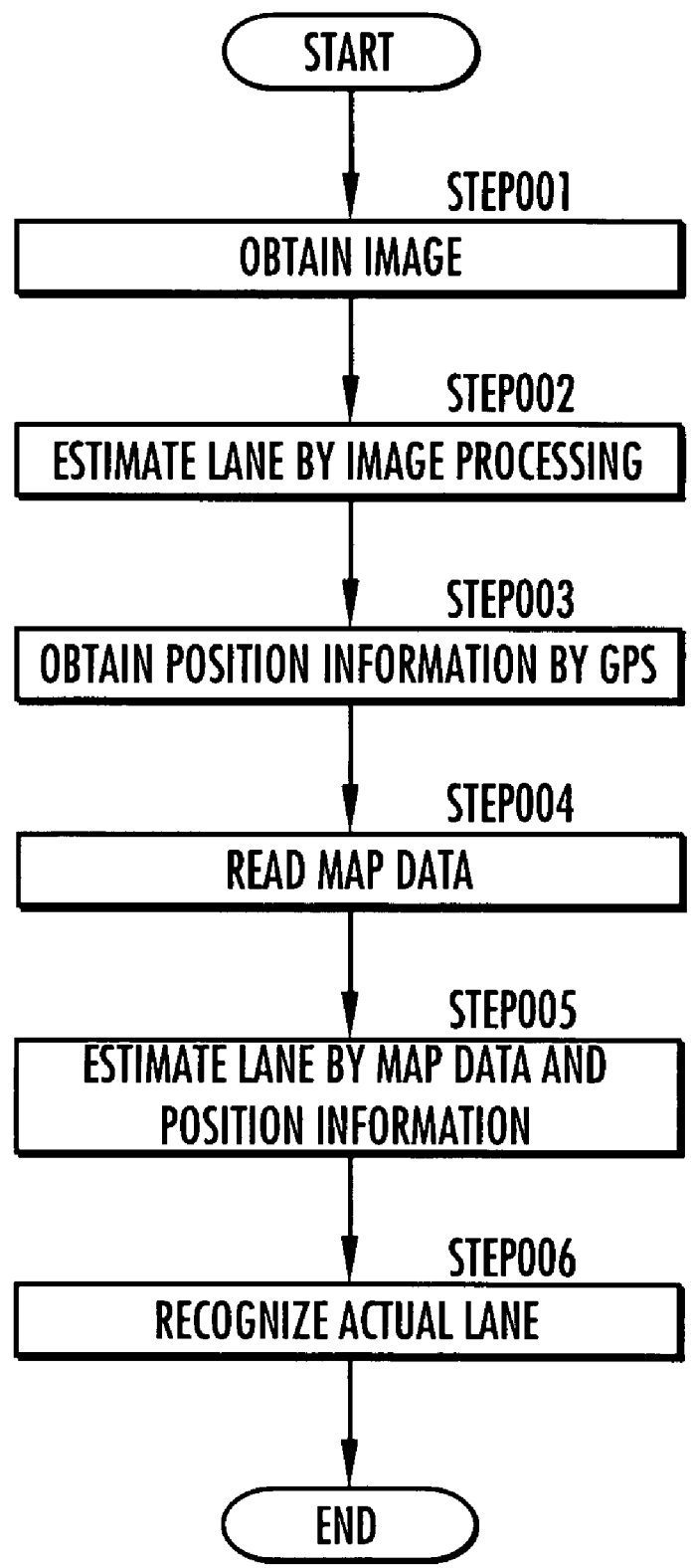
FIG. 2 It is a flowchart showing a lane recognition process of the lane recognizing device in FIG. 1.
Figure 3:
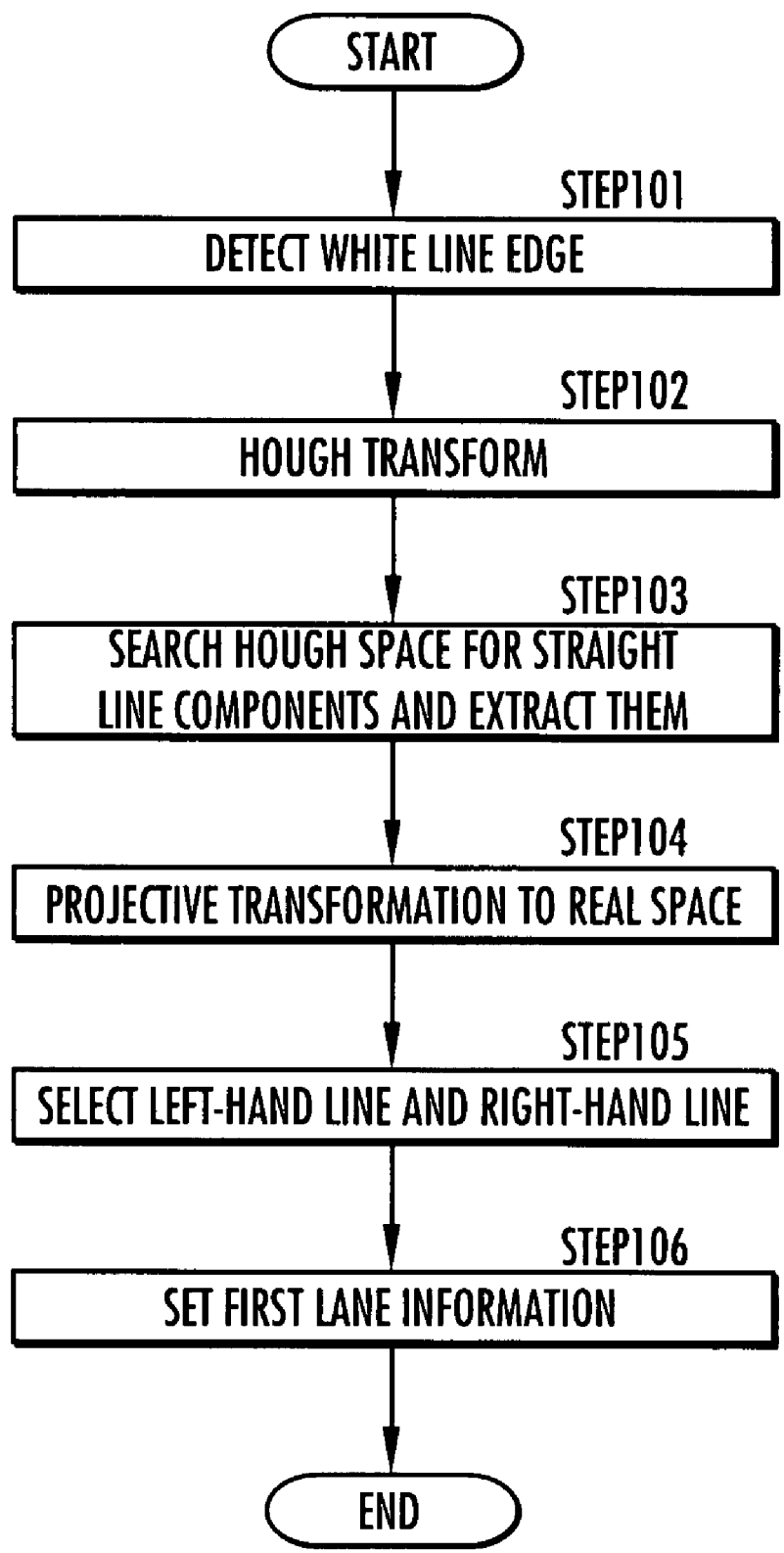
FIG. 3 It is a flowchart showing a lane estimation process by image processing in the lane recognition process of the lane recognizing device in FIG. 1.
Figure 4:
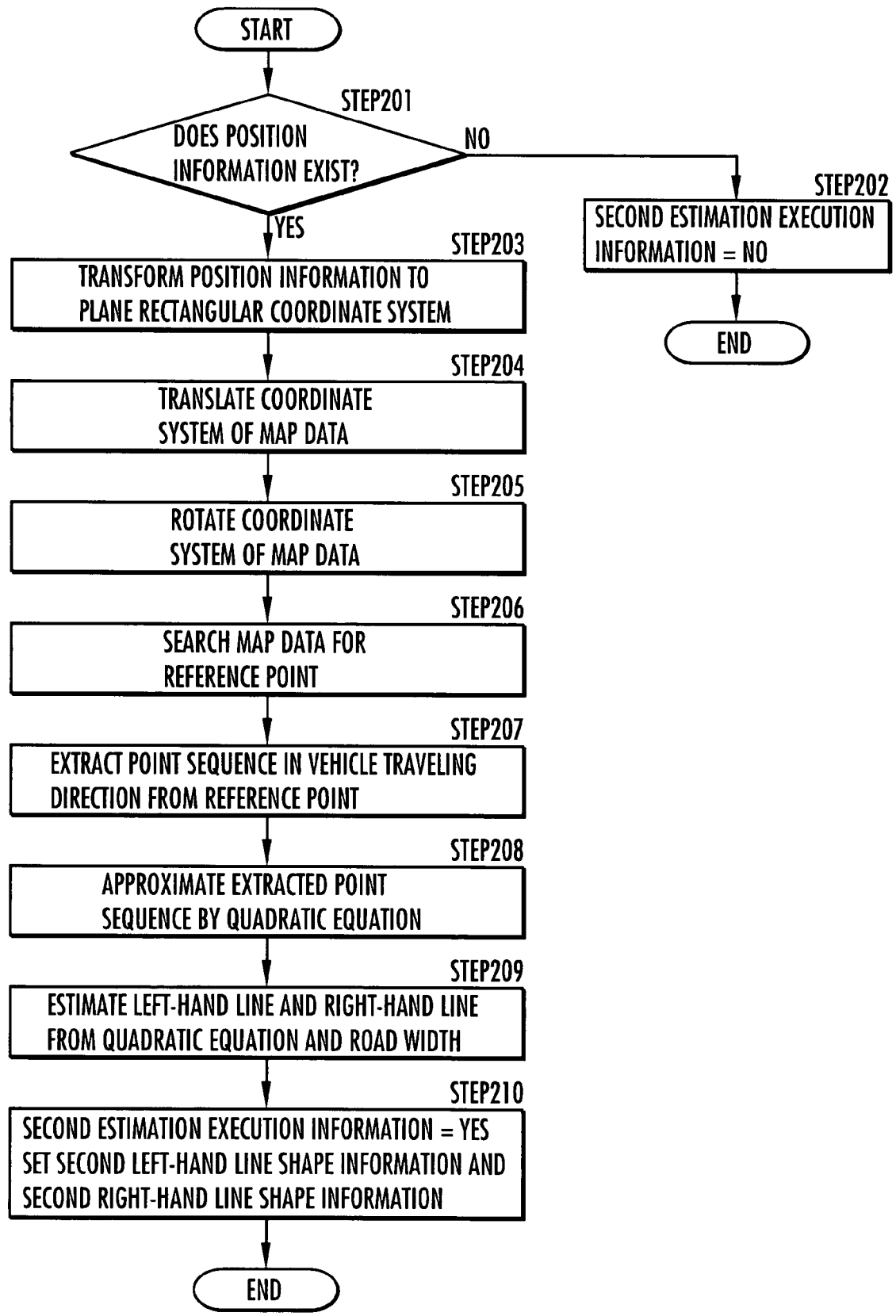
FIG. 4 It is a flowchart showing a lane estimation process by GPS information and map data in the lane recognition process of the lane recognizing device in FIG. 1.
Figure 5:
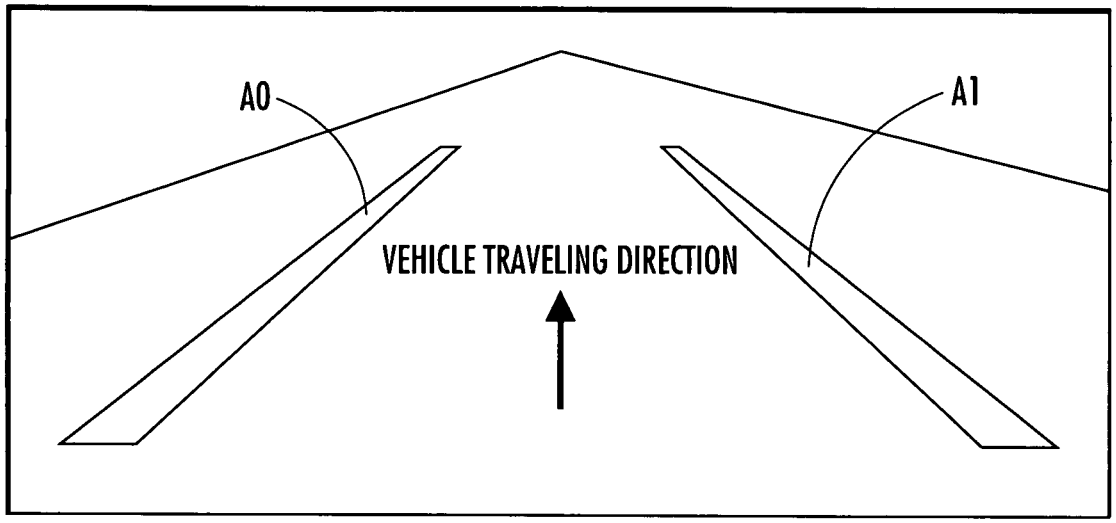
FIG. 5 It is an illustrative diagram showing a road lane to be recognized by the lane recognizing device in FIG. 1.
Figure 6:
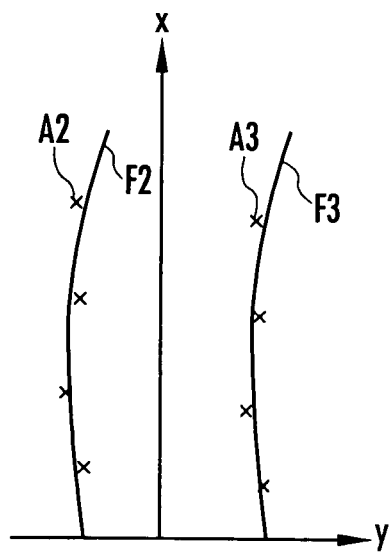
FIG. 6 It is an explanatory diagram of the lane estimation process by image processing of the lane recognizing device in FIG. 1.
Figure 7A:
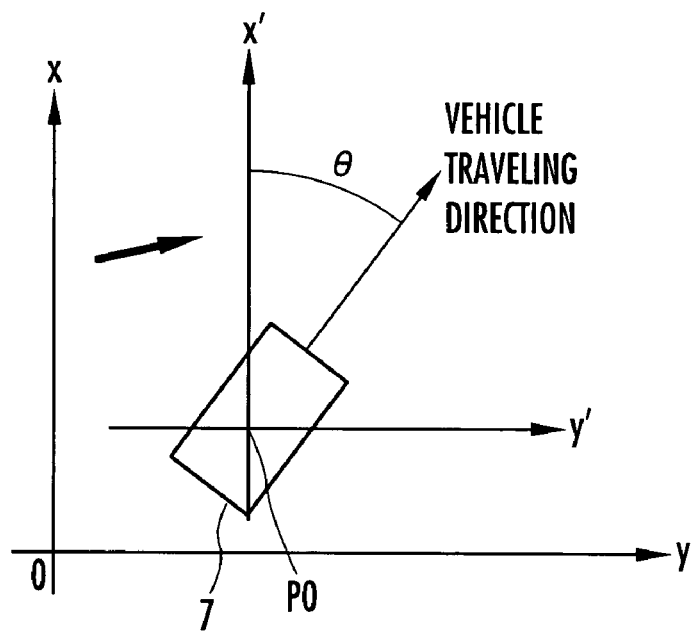
FIG. 7 It is an explanatory diagram of the lane estimation process by GPS information and map data of the lane recognizing device in FIG. 1.
Figure 7B:
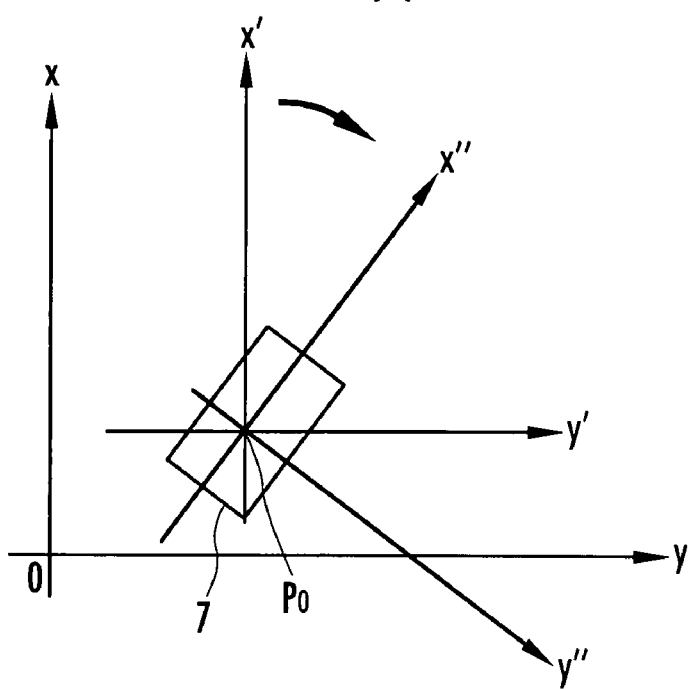
Figure 8:
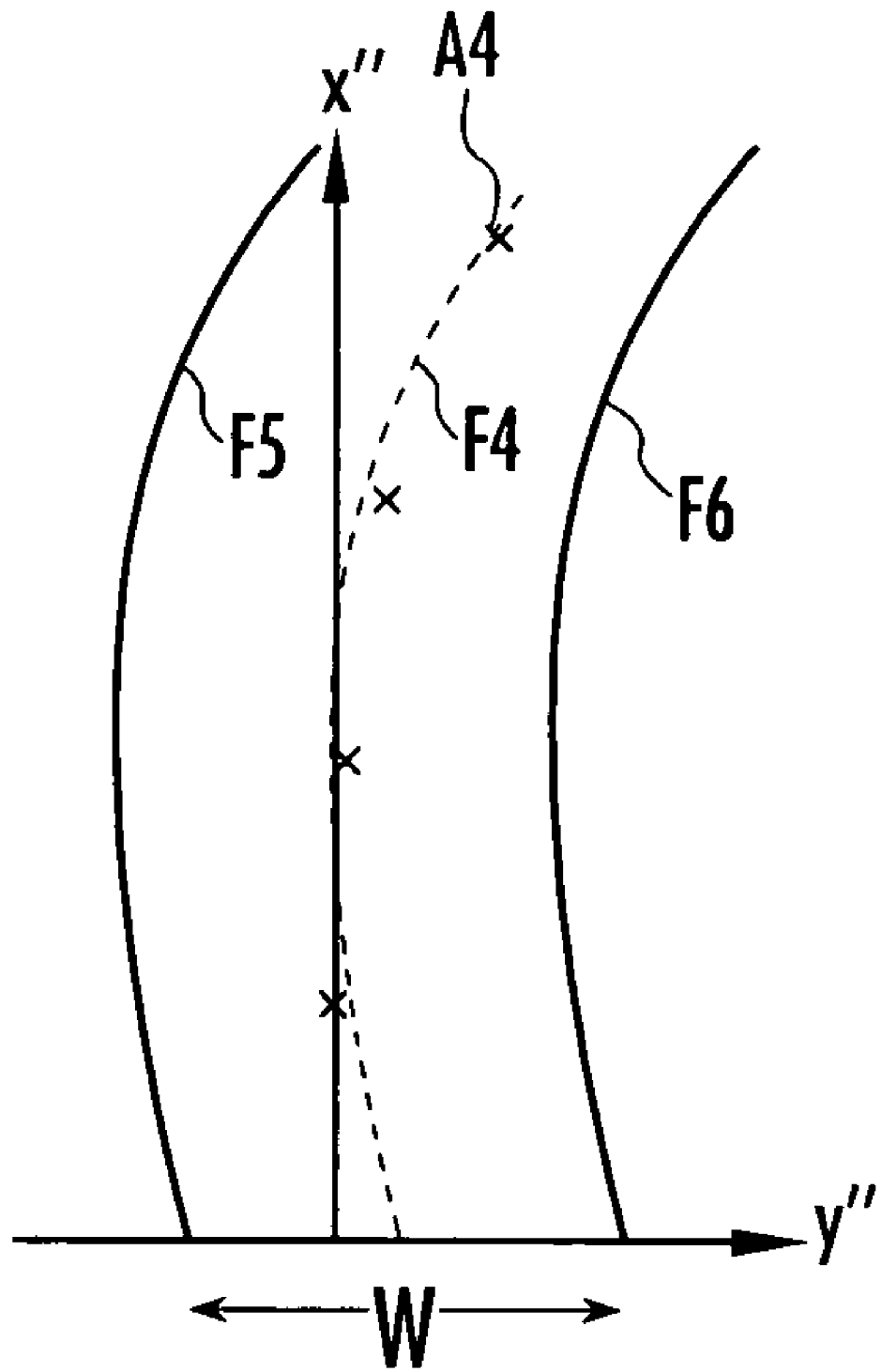
FIG. 8 It is an explanatory diagram of the lane estimation process by GPS information and map data of the lane recognizing device in FIG. 1.

An embodiment of the present invention will be described with reference to the accompanying drawings. FIG. 1 is a functional block diagram of a lane recognizing device according to a first embodiment of the present invention. FIGS. 2 to 4 are flowcharts of a lane recognition process in the lane recognizing device in FIG. 1. FIG. 5 is an illustrative diagram of a lane to be recognized in the lane recognition process by the lane recognizing device. FIGS. 6 to 8 are explanatory diagrams of the lane recognition process in the lane recognizing device in FIG. 1. Note that the first embodiment corresponds to the first aspect of the present invention.

Referring to FIG. 1, a lane recognizing device 1 is an electronic unit composed of a microcomputer and the like and is mounted on a vehicle 7, including, as its processing functions, an image processing means 2 which performs a process of estimating a lane by obtaining a road image, a map data storage medium 3 which holds map data, a GPS unit 4 which obtains the current position information of a vehicle by GPS, a lane estimating means 5 which performs a process of estimating a lane from the map data and the current position information of the vehicle, and an actual lane recognizing means 6 which performs a process of recognizing an actual lane on the basis of a result of the process of the image processing means 2 and a result of the process of the lane estimating means 5.

The image processing means 2 is attached to the front of the vehicle 7 to obtain a road image via a video camera 8 (a CCD camera or the like, corresponding to imaging means of the present invention) which captures an image of the road ahead of the vehicle 7. Then, the image processing means 2 performs a process of estimating a lane along which the vehicle 7 travels by processing the obtained road image and outputs a result of the process as first lane information. The vehicle of the present invention includes the video camera 8 and the lane recognizing device 1.

The map data storage medium 3 (the holding means of the present invention) is a CD-ROM, DVD, HDD or other storage medium which records map data. A road position, a lane width of a road, and the like are recorded as map data in the map data storage medium 3.

The GPS unit 4 (the position information obtaining means of the present invention) receives information transmitted from a plurality of global positioning system (GPS) satellites to obtain the current position information (latitude, longitude, and traveling direction) of the vehicle 7 on the basis of the received information.

The lane estimating means 5 identifies the information on the road along which the vehicle 7 is currently traveling by using the map data read from the map data storage medium 3 and the current position information of the vehicle 7 obtained by the GPS unit 4. Then, the lane estimating means 5 performs the process of estimating the lane from the identified road information and outputs a result of the process as second lane information.

The actual lane recognizing means 6 performs the process of recognizing actual lane information on the basis of the first lane information output from the image processing means 2 and the second lane information output from the lane estimating means 5 and outputs a result of the process as information indicating an actual lane (hereinafter, referred to as actual lane information). Moreover, if the actual lane is recognized, the actual lane recognizing means 6 sets the reliability of the recognition and outputs it together with the actual lane information. The reliability is an index of recognition accuracy and is set to one of three levels, level 1 to level 3 according to the recognition result. Level 1 indicates that the recognition reliability is highest (high accuracy), level 2 indicates that the reliability is lower than level 1 (medium accuracy), and level 3 indicates that the reliability is still lower than level 2 (low accuracy).

Subsequently, the operation of the lane recognizing device 1 according to this embodiment will be described with reference to the flowcharts shown in FIG. 2 to FIG. 4. FIG. 2 is a flowchart showing the general operation of the lane recognition process (the main routine process of the lane recognizing device 1). FIG. 3 is a flowchart showing a process of estimating a lane by image processing (a subroutine process). FIG. 4 is a flowchart showing a process of estimating the lane from map data and position information (a subroutine process). In the following, assuming that the traveling direction of the vehicle 7 corresponds to the arrow direction as shown in FIG. 5, the operation is described by giving an example in which the left side of the lane of a road along which the vehicle 7 is traveling is defined by a lane mark A0 and the right side of the lane is defined by a lane mark A1. The lane marks A0 and A1 are assumed to be, for example, white lines by way of example.

Referring to FIG. 2, first, the image processing means 2 obtains a road image by receiving a video signal output from the video camera 8 (step 001).

Subsequently, the image processing means 2 performs a process of estimating a lane from the obtained road image (hereinafter, referred to as a first lane estimation process) and outputs the first lane information (step 002). The output first lane information includes first left estimation execution information indicating whether the lane mark A0 is already estimated by the first lane estimation process, first left-hand line shape information indicating the shape of the estimated lane mark A0 in the case where the lane mark A0 is already estimated, a first right estimation execution information indicating whether the lane mark A1 is already estimated by the first lane estimation process, and first right-hand line shape information indicating the shape of the estimated lane mark A1 in the case where the lane mark A1 is already estimated. If the lane mark A0 is already estimated, the first left estimation execution information is set to "Yes," or otherwise, it is set to "No." Similarly, the first right estimation execution information is set to "Yes" if the lane mark A1 is already estimated, or otherwise, it is set to "No."

The first lane estimation process is performed as shown in FIG. 3. First, the image processing means 2 performs an edge detection process to detect a white line from the obtained image (step 101). Subsequently, the image processing means 2 performs a Hough transform for output data of the edge detection (step 102). Then, the image processing means 2 searches the Hough space for straight line components and extracts them (step 103). Thereafter, the image processing means 2 applies a projective transformation to data of the extracted straight line components from the Hough space to the image space and further applies a projective transformation to the data from the image space to the real space (the coordinate space fixed to the vehicle) (step 104).

Next, in step 105, the image processing means 2 selects data of straight line components estimated to be the lane mark A0 out of the data of the straight line components transformed to the real space and determines the coordinates of a plurality of points included in the selected data of the straight line components to be point sequence data A2. Similarly, the image processing means 2 selects data of straight line components estimated to be the lane mark A1 and determines the coordinates of a plurality of points included in the selected data of the straight line components to be point sequence data A3. The selected point sequence data A2 and A3 are as shown in FIG. 6. In FIG. 6, the coordinate system is a plane rectangular coordinate system having x axis and y axis as coordinate axes, with the center position of the vehicle 7 as an origin and the traveling direction of the vehicle 7 as the x-axis direction.

Subsequently, as shown in FIG. 6, the image processing means 2 obtains a quadratic equation F2 $y=ax^*x+bx+c$) which approximates the point sequence data A2 and a quadratic equation F3 ($y=dx^*x+cx+f$) which approximates the point sequence data A3 (a, b, c, d, e, and f are given coefficients). A least squares method is used as the approximation method.

Then, in step 106, the image processing means 2 sets first lane information. If the quadratic equation F2 is appropriately obtained then, the image processing means 2 sets the first estimation execution information to "Yes" and sets the first left-hand line shape information to $y=ax^*x+bx+c$. Unless the quadratic equation F2 is appropriately obtained such as, for example, unless the point sequence data A2 is obtained, unless the quadratic equation F2 is obtained due to an insufficient number of data in the point sequence data A2, or if the obtained quadratic equation F2 is poorly approximate to the point sequence data A2 (the point sequence data A2 varies widely with respect to the quadratic equation F2), the image processing means 2 sets the first left estimation execution information to "No."

If the quadratic equation F3 is appropriately obtained, the image processing means 2 sets the first right estimation execution information to "Yes" and sets the first right-hand line shape information to y=dx*x+ex+f. Unless the quadratic equation F3 is appropriately obtained such as, for example, unless the point sequence data A3 is obtained, unless the quadratic equation F3 is obtained due to an insufficient number of data in the point sequence data A3, or if the obtained quadratic equation F3 is poorly approximate to the point sequence data A3 (the point sequence data A3 varies widely with respect to the quadratic equation F3), the image processing means 2 sets the first right estimation execution information to "No."

Thereafter, returning to FIG. 2, the GPS unit 4 performs a process of obtaining the current position information of the vehicle 7 (step 003). The current position information of the vehicle 7 to be obtained includes a position (latitude x0, longitude y0) and a traveling orientation θ. The information is represented in a spherical coordinate system, and the traveling orientation θ is set with the northern direction as zero degree and the clockwise direction as positive. Then, the lane estimating means 5 reads map data from the map data storage medium 3 (step 004). The map data to be read includes the coordinates (X,Y) of a point sequence on the center line of the lane of the road (the lane along which the vehicle travels) and the lane width w at each point (X, Y): these data are represented in the plane rectangular coordinate system with the x axis set in the north-south direction and the y axis set in the east-west direction.

Subsequently, the lane estimating means 5 performs a process of estimating the lane by the map data and position information (hereinafter, referred to as the second lane estimation process) and outputs the second lane information (step 005). The output second lane information includes second estimation execution information indicating whether the lane mark A0 and the lane mark A1 are already estimated by the second lane estimation process, second left-hand line shape information indicating the shape of the estimated lane mark A0 in the case where the lane mark A0 is already estimated, and second right-hand line shape information indicating the shape of the estimated lane mark A1 in the case where the lane mark A1 is already estimated. The second estimation execution information is set to "Yes" if the lane mark A0 and the lane mark A1 are already estimated, or otherwise it is set to "No."

The second lane estimation process is performed as shown in FIG. 4. First, the lane estimating means 5 checks whether the current position information of the vehicle 7 is already obtained by the GPS unit 4 (step 201). Unless the current position information of the vehicle 7 is obtained due to poor reception from GPS satellites or the like, the control proceeds to step 202, where the lane estimating means 5 sets the second estimation execution information to "No."

If the current position information of the vehicle 7 is already obtained in step 201, the control proceeds to step 203, where the lane estimating means 5 coordinate-transforms the obtained position (latitude x0, longitude y0) of the vehicle 7 from the spherical coordinate system to the plane rectangular coordinate system in the map data. Position P0 of the vehicle 7 obtained by the coordinate transformation is as shown in FIGS. 7(a) and 7(b). In FIGS. 7(a) and 7(b), the x axis, y axis, and origin 0 represent the coordinate system xy of the read map data.

Next, in step 204, as shown in FIG. 7(a), the lane estimating means 5 coordinate-transforms (translates) the coordinate system xy of the map data to a coordinate system x'y' with the position P0 of the vehicle 7 as the origin and the x' axis and y' axis as coordinate axes. In this situation, the traveling direction of the vehicle 7 is as indicated by an arrow, which is shown as a direction rotated by the traveling orientation of θ degrees from the x' axis. Next, in step 205, as shown in FIG. 7(b), the lane estimating means 5 rotationally transforms the coordinate system x'y' (rotates it by θ degrees) to a coordinate system x"y" with the traveling direction of the vehicle 7 as the x" direction and with the x" axis and y" axis as coordinate axes. This transforms the map data to the coordinate system x"y". The processes of subsequent steps 206 to 208 are performed in the coordinate system x"y".

Next, in step 206, the lane estimating means 5 searches for a point (reference point P1) on the map data closest to the origin to obtain the coordinates (x1, y1) of the reference point P1 and the lane width w at the reference point P1. Then, in step 207, the lane estimating means 5 extracts a plurality of points (P2, - - -, Pn) in the range from the reference point P1 to a point a given distance X ahead thereof in the vehicle traveling direction (n is an integer of 3 or greater). The given distance X is assumed to be, for example, 100m or so. The coordinate data {(x1, y1), (x2, y2), - - -, (xn, yn)} of the reference point P1 and the extracted points (P2, - - -, and Pn) are considered to be point sequence data A4. The point sequence data A4 is as shown in FIG. 8.

Next, in step 207, as shown in FIG. 8, the lane estimating means 5 obtains a quadratic equation F4 y=gx*x+hx+i) which approximates the point sequence data A4 (g, h, and i are given coefficients). A least squares method is used then as the approximation method.

Next, in step 208, as shown in FIG. 8, the lane estimating means 5 estimates the lane marks A0 and A1 from the obtained quadratic equation F4 and the lane width w. In this process, the lane estimating means 5 estimates the lane mark A0 by a quadratic equation F5 (y=gx*x+hx+i−w/2) and estimates the lane mark A1 by a quadratic equation F6 (y=gx*x+hx+i+w/2). Then, in step 209, the lane estimating means 5 sets the second estimation execution information to "Yes" and sets the second left-hand line shape information to y=gx*x+hx+i−w/2 and the second right-hand line shape information to y=gx*x+hx+i+w/2.

Subsequently, returning to FIG. 2, the actual lane recognizing means 6 performs a process of recognizing an actual lane from the first lane information and the second lane information (hereinafter, referred to as actual lane recognition process) and outputs actual lane information and reliability (step 006). The output actual lane information includes actual left recognition execution information indicating whether the lane mark A0 is already recognized by the actual lane recognition process, actual left-hand line shape information indicating the shape of the recognized lane mark A0 in the case where the lane mark A0 is already recognized, actual right recognition execution information indicating whether the lane mark A1 is already recognized by the actual lane recognition process, and actual right-hand line shape information indicating the shape of the recognized lane mark A1 in the case where the lane mark A1 is already recognized. If the lane mark A0 is already recognized, the actual left recognition execution information is set to "Yes," or otherwise, it is set to "No." Similarly, the actual right recognition execution information is set to "Yes" if the lane mark A1 is already recognized, or otherwise, it is set to "No."

First, the actual lane recognizing means 6 checks the set values of the first left estimation execution information, the first right estimation execution information, and the second estimation execution information. Thereafter, it performs the actual lane recognition process for the following eight cases (a) to (h) according to the combination of the above three set values.

(a) If the first left estimation execution information="Yes," the first right estimation execution information="Yes," and the second estimation execution information="Yes":

In this case, the actual lane recognizing means 6 calculates a left-hand line similarity index value L1 which indicates a degree of similarity between the first left-hand line shape information and the second left-hand line shape information, first. As the left-hand line similarity index value L1, a value of a comparison function F1 expressed by the following equation (1) is used.

[Equation 1]

$$F1(f1(x), f2(x)) = \sum_{x=0}^{N} (f1(x) - f2(x))^2 \quad (1)$$

The actual lane recognizing means 6 considers the left-hand value calculated by using ax*x+bx+c (the first left-hand line shape information) for f1(x) in the right-hand side of equation (1) and using gx*x+hx+i−w/2 (the second left-hand line shape information) for f2(x) to be the left-hand line similarity index value L1. Note that the calculated left-hand line similarity index value L1 decreases as the degree of similarity (similarity) between f1(x) and f2(x) increases. In addition, N in the right-hand side of equation (1) is the number of samples of the values of the predetermined f1(x) and f2(x), for example, N=50.

Subsequently, similarly to the left-hand line similarity index value L1, the actual lane recognizing means 6 calculates a right-hand line similarity index value R1, which indicates the degree of similarity between the first right-hand line shape information and the second right-hand line shape information, by using equation (1). The actual lane recognizing means 6 considers the left-hand value calculated by using dx*x+ex+f (the first right-hand line shape information) for f1(x) in the right-hand side of equation (1) and using gx*x+hx+i+w/2 (the second right-hand line shape information) for f2(x) to be the right-hand line similarity index value R1. Note that the calculated right-hand line similarity index value R1 decreases as the degree of similarity (similarity) between f1(x) and f2(x) increases, as is the case with the left-hand line similarity index value L1.

Subsequently, the actual lane recognizing means 6 compares the left-hand line similarity index value L1 and the right-hand line similarity index value R1 each with a given threshold value S1. Then, the actual lane recognizing means 6 sets the actual lane information and the reliability for the following two cases (a1) and (a2) according to a result of the comparison.

(a1) If L1<S1 and R1<S1:

In this case, the actual lane recognizing means 6 sets the actual left recognition execution information to "Yes" and sets the first left-hand line shape information as the actual left-hand line shape information. In addition, the actual lane recognizing means 6 sets the actual right recognition execution information to "Yes" and sets the first right-hand line shape information as the actual right-hand line shape information. Thereby, the information indicating that the lane is already recognized is appropriately set as the actual lane information if the degree of similarity is high between the shape of the lane estimated by the image processing and the shape of the lane estimated by the map data and position information and if it is possible to consider that the lane is accurately estimated by the image processing as a result of verification of the reliability of lane estimation by the image processing based on the information on the lane estimated by the map data and position information. In this condition, the shape information on the lane estimated by the image processing that can be considered to be higher in accuracy than the shape information on the lane estimated by the map data and position information is set as the actual lane information regarding the lane marks A0 and A1.

Moreover, in this case, the actual lane recognizing means 6 sets the reliability to level 1. Thereby, if both of the lane marks A0 and A1 can be considered to be estimated accurately, the reliability is set to the highest level.

(a2) If L1≧S1 or R1≦S1:

In this case, the actual lane recognizing means 6 sets the actual left recognition execution information and the actual right recognition execution information each to "No." Thereby, information indicating that the lane is not recognized is appropriately set as the actual lane information if the shape of the lane estimated by the image processing differs from the shape of the lane estimated by the map data and position information and if the actual lane is likely to be estimated inappropriately in one or both of the lane estimation by the image processing and the lane estimation by the map data and position information.

(b) If the first left estimation execution information="Yes," the first right estimation execution information="Yes," and the second estimation execution information="No":

In this case, the actual lane recognizing means 6 sets the actual left recognition execution information to "Yes" and sets the first left-hand line shape information as the actual left-hand line shape information. In addition, the actual lane recognizing means 6 sets the actual right recognition execution information to "Yes" and sets the first right-hand line shape information as the actual right-hand line shape information. Thereby, if the lane is estimated by the image processing in the case where the lane is not estimated by the map data and position information, the result of the lane estimation by the image processing is directly used as actual lane information.

In this case, the actual lane recognizing means 6 sets the reliability to level 2. Thereby, if the lane is estimated only by the image processing and the reliability of the lane estimation by the image processing cannot be verified using the information on the lane estimated by the map data and position information, the reliability is set lower than level 1.

(c) If the first left estimation execution information="Yes," the first right estimation execution information="No," and the second estimation execution information="Yes":

In this case, the actual lane recognizing means 6 calculates the left-hand line similarity index value L1 using equation (1) from the first left-hand line shape information and the second left-hand line shape information, first. Then, the actual lane recognizing means 6 compares the left-hand line similarity index value L1 with the given threshold value S1. Thereafter, the actual lane recognizing means 6 sets the actual lane information and reliability for the following two cases (c1) and (c2) according to a result of the comparison.

(c1) If L1<S1:

In this case, the actual lane recognizing means 6 sets the actual left recognition execution information to "Yes" and sets the first left-hand line shape information as the actual left-hand line shape information. In addition, the actual lane recognizing means 6 sets the actual right recognition execution information to "Yes" and sets the second right-hand line shape information as the actual right-hand line shape information. Thereby, the information indicating that the lane is already recognized is appropriately set as the actual lane information if the degree of similarity is high between the shape of the lane estimated by the image processing and the shape of the lane estimated by the map data and position information and if it is possible to consider that the lane is accurately estimated by the image processing as a result of verification of the reliability of the lane estimation by the image processing based on the information on the lane estimated by the map data and position information. In this condition, the shape information on the lane estimated by the image processing that can be considered to be higher in accuracy than the shape information on the lane estimated by the map data and position information is set as the actual lane information regarding the lane mark A0. Moreover, regarding the lane mark A1 of the lane that cannot be estimated by the image processing, the image processing result is supplemented with the information on the lane estimated by the map data and position information, by which the opportunities for detecting the lane can be increased as much as possible.

Moreover, in this case, the actual lane recognizing means 6 sets the reliability to level 2. Thereby, if only one of the lane marks A0 and A1 can be considered to be estimated accurately, the reliability is set lower than level 1.

(c2) If $L1 \geqq S1$:

In this case, the actual lane recognizing means 6 sets the actual left recognition execution information and the actual right recognition execution information each to "No." Thereby, information indicating that the lane is not recognized is appropriately set as the actual lane information if the shape of the lane estimated by the image processing differs from the shape of the lane estimated by the map data and position information and if the actual lane is likely to be estimated inappropriately in one or both of the lane estimation by the image processing and the lane estimation by the map data and position information.

(d) If the first left estimation execution information="Yes," the first right estimation execution information="No," and the second estimation execution information="No":

In this case, the actual lane recognizing means 6 sets the actual left recognition execution information to "Yes" and sets the first left-hand line shape information as the actual left-hand line shape information. In addition, the actual lane recognizing means 6 sets the actual right recognition execution information to "No." Thereby, if the lane is estimated by the image processing in the case where the lane is not estimated by the map data and position information, the result of the lane estimation by the image processing is directly used as actual lane information.

In this case, the actual lane recognizing means 6 sets the reliability to level 3. Thereby, if the lane is estimated only by the image processing and the reliability of the lane estimation by the image processing cannot be verified using the information on the lane estimated by the map data and position information, the reliability is set lower than level 1. Furthermore, only one of the lane marks A0 and A1 is already estimated by the image processing, and therefore the reliability is set lower than level 2.

(e) If the first left estimation execution information="No," the first right estimation execution information="Yes," and the second estimation execution information="Yes":

In this case, the actual lane recognizing means 6 calculates the right-hand line similarity index value R1 using equation (1) from the first right-hand line shape information and the second right-hand line shape information, first. Then, the actual lane recognizing means 6 compares the right-hand line similarity index value R1 with the given threshold value S1. Thereafter, the actual lane recognizing means 6 sets the actual lane information and reliability for the following two cases (e1) and (e2) according to a result of the comparison.

(e1) If $R1 < S1$:

In this case, the actual lane recognizing means 6 sets the actual left recognition execution information to "Yes" and sets the second left-hand line shape information as the actual left-hand line shape information. In addition, the actual lane recognizing means 6 sets the actual right recognition execution information to "Yes" and sets the first right-hand line shape information as the actual right-hand line shape information. Thereby, the information indicating that the lane is already recognized is appropriately set as the actual lane information if the degree of similarity is high between the shape of the lane estimated by the image processing and the shape of the lane estimated by the map data and position information and if it is possible to consider that the lane is accurately estimated by the image processing as a result of verification of the reliability of the lane estimation by the image processing based on the information on the lane estimated by the map data and position information. In this condition, the shape information on the lane estimated by the image processing that can be considered to be higher in accuracy than the shape information on the lane estimated by the map data and position information is set as the actual lane information regarding the lane mark A1. Moreover, regarding the lane mark A0 of a lane that cannot be estimated by the image processing, the image processing result is supplemented with the information on the lane estimated by the map data and position information, by which the opportunities for detecting the lane can be increased as much as possible.

Moreover, in this case, the actual lane recognizing means 6 sets the reliability to level 2. Thereby, if only one of the lane marks A0 and A1 can be considered to be estimated accurately, the reliability is set lower than level 1.

(e2) If $R1 \geqq S1$:

In this case, the actual lane recognizing means 6 sets the actual left recognition execution information and the actual right recognition execution information each to "No." Thereby, the information indicating that the lane is not recognized is appropriately set as the actual lane information if the shape of the lane estimated by the image processing differs from the shape of the lane estimated by the map data and position information and if the actual lane is likely to be estimated inappropriately in one or both of the lane estimation by the image processing and the lane estimation by the map data and position information.

(f) If the first left estimation execution information="No," the first right estimation execution information="Yes," and the second estimation execution information="No":

In this case, the actual lane recognizing means 6 sets the actual left recognition execution information to "No." In addition, the actual lane recognizing means 6 sets the actual right recognition execution information to "Yes" and the first right-hand line shape information as the actual right-hand line shape information. Thereby, if the lane is already estimated by the image processing in the case where the lane is not estimated by the map data and position information, the result of the lane estimation by the image processing is directly used as actual lane information.

In this case, the actual lane recognizing means 6 sets the reliability to level 3. Thereby, if the lane is estimated only by the image processing and the reliability of the lane estimation by the image processing cannot be verified using the information on the lane estimated by the map data and position information, the reliability is set lower than level 1. Furthermore, only one of the lane marks A0 and A1 is estimated by the image processing, and therefore the reliability is set lower than level 2.

(g) If the first left estimation execution information="No," the first right estimation execution information="No," and the second estimation execution information="Yes":

In this case, the actual lane recognizing means 6 sets the actual left recognition execution information to "Yes" and sets the second left-hand line shape information as the actual left-hand line shape information. In addition, the actual lane recognizing means 6 sets the actual right recognition execution information to "Yes" and the second right-hand line shape information as the actual right-hand line shape information. Thereby, even if the lane cannot be estimated by the image processing, the image processing result is supplemented with the information on the lane estimated by the map data and position information, by which the opportunities for detecting the lane can be increased as much as possible.

In this case, the actual lane recognizing means 6 sets the reliability to level 3. Thereby, if the lane is estimated only by the map data and position information, the accuracy is considered to be lower than in the case of estimation only by the image processing in consideration of the GPS position-fix accuracy or the like and then the reliability is set lower than level 2.

(h) If the first left estimation execution information="No," the first right estimation execution information="No," and the second estimation execution information="No":

In this case, the actual lane recognizing means 6 sets the actual left recognition execution information and the actual right recognition execution information each to "No." In this case, the actual lane recognizing means 6 makes no settings as the actual left-hand line shape information and the actual right-hand line shape information. Thereby, it is clearly indicted that no actual lane has been recognized.

As a result of the foregoing processes, the lane can be detected accurately while increasing the opportunities for detecting the lane as much as possible by using the information on the lane estimated by the image processing and the information on the lane estimated by the map data and position information. Moreover, in this embodiment, the vehicle is controlled and information is provided to the driver on the basis of the output actual lane information and reliability. In the above, for example, if the reliability is set to level 1, the steering control of the vehicle is performed on the basis of the actual lane shape information, and if the reliability is set to level 2 or level 3, no steering control of the vehicle is performed, but the driver is provided with information when there is a possibility that the vehicle will deviate from the lane.

While the lane is defined by the left-hand line and the right-hand line in the first embodiment, it can be defined, for example, only by one of the left-hand line and the right-hand line as a second embodiment (which corresponds to the second aspect of the present invention). This embodiment provides the same operation and effect as in the case where the lane is defined by the left-hand line and the right-hand line as described above.

While the GPS unit 4 is used as position information obtaining means in the first and second embodiments, it is also possible to use position information obtained by autonomous navigation, instead of obtaining the vehicle position information from the GPS.

INDUSTRIAL APPLICABILITY

As described above, the present invention is adapted for use in providing a driver with information in a vehicle or controlling vehicle behaviors since it can accurately detect a lane while increasing the opportunities for detecting the lane as much as possible by processing the image of a road ahead of the vehicle and obtaining information on the road from a GPS or the like and map data.

The invention claimed is:

1. A vehicle comprising:
    an imaging means;
    an image processing means which obtains an image of a road via the imaging means, performs a process of estimating a lane of the road by processing the obtained image, and outputs a result of the process as first lane information;
    a holding means which holds map data of the road;
    a position information obtaining means which obtains the current position information of the vehicle;
    a lane estimating means which performs a process of estimating the lane of the road using the map data and the current position information and outputs a result of the process as second lane information;
    a means which calculates lane similarity, which is a degree of similarity between the shape of the lane indicated by the first lane information and the shape of the lane indicated by the second lane information; and
    an actual lane recognizing means which recognizes an actual lane of the road on the basis of the first lane information, the second lane information, and a result of comparison between the lane similarity and a given threshold value, wherein:
        the first lane information includes first estimation execution information indicating whether the lane is estimated by the process of the image processing means and first lane shape information indicating the shape of the estimated lane in the case where the lane is estimated;
        the second lane information includes second estimation execution information indicating whether the lane is estimated by the process of the lane estimating means and second lane shape information indicating the shape of the estimated lane in the case where the lane is estimated; and
        the actual lane recognizing means includes: a means which determines and outputs actual lane recognition execution information indicating whether the actual lane is recognized on the basis of the first estimation execution information, the second estimation execution information, and the result of comparison between the lane similarity and the given threshold value; and a means which determines and outputs actual lane shape information indicating the shape of the recognized lane, in the case where the lane is recognized, on the basis of the first lane shape information and the second lane shape information.

2. The vehicle according to claim 1, wherein the actual lane recognizing means sets information indicating that the lane is recognized as the actual lane recognition execution information and sets the second lane shape information as the actual lane shape information in the case where the first estimation execution information indicates that the lane is not estimated and in the case where the second estimation execution information indicates that the lane is estimated.

3. The vehicle according to claim 1, wherein, in the case where the second estimation execution information indicates that the lane is not estimated, the actual lane recognizing means sets information indicating that the lane is recognized as the actual lane recognition execution information and sets the first lane shape information as the actual lane shape information in the case where the first estimation execution information indicates that the lane is estimated; and sets information indicating that the lane is not recognized as the actual lane recognition execution information in the case where the first estimation execution information indicates that the lane is not estimated.

4. A lane recognizing device, comprising:
an image processing means which performs a process of estimating a lane of a road by processing an image of the road obtained via an imaging means mounted on a vehicle and outputs a result of the process as first lane information;
a holding means which holds map data of the road;
a position information obtaining means which obtains the current position information of the vehicle;
a lane estimating means which performs a process of estimating the lane of the road using the map data and the current position information and outputs a result of the process as second lane information;
a means which calculates lane similarity, which is a degree of similarity between the shape of the lane indicated by the first lane information and the shape of the lane indicated by the second lane information; and
an actual lane recognizing means which recognizes an actual lane of the road on the basis of the first lane information, the second lane information, and a result of comparison between the lane similarity and a given threshold value, wherein:
the first lane information includes first estimation execution information indicating whether the lane is estimated by the process of the image processing means and first lane shape information indicating the shape of the estimated lane in the case where the lane is estimated;
the second lane information includes second estimation execution information indicating whether the lane is estimated by the process of the lane estimating means and second lane shape information indicating the shape of the estimated lane in the case where the lane is estimated; and
the actual lane recognizing means includes: a means which determines and outputs actual lane recognition execution information indicating whether the actual lane is recognized on the basis of the first estimation execution information, the second estimation execution information, and the result of comparison between the lane similarity and the given threshold value; and a means which determines and outputs actual lane shape information indicating the shape of the recognized lane in the case where the lane is recognized on the basis of the first lane shape information and the second lane shape information.

5. The lane recognizing device according to claim 4, wherein the actual lane recognizing means sets information indicating that the lane is recognized as the actual lane recognition execution information and sets the second lane shape information as the actual lane shape information in the case where the first estimation execution information indicates that the lane is not estimated and in the case where the second estimation execution information indicates that the lane is estimated.

6. The lane recognizing device according to claim 4, wherein, in the case where the second estimation execution information indicates that the lane is not estimated, the actual lane recognizing means sets information indicating that the lane is recognized as the actual lane recognition execution information and sets the first lane shape information as the actual lane shape information in the case where the first estimation execution information indicates that the lane is estimated; and sets information indicating that the lane is not recognized as the actual lane recognition execution information in the case where the first estimation execution information indicates that the lane is not estimated.

* * * * *